United States Patent [19]
Chang et al.

[11] Patent Number: 5,955,532
[45] Date of Patent: Sep. 21, 1999

[54] AQUEOUS COATING COMPOSITION OF A SELF-STABILIZED CROSSLINKED LATEX

[75] Inventors: David C.K. Chang, Bloomfield Hills, Mich.; Michael Fryd, Moorestown, N.J.

[73] Assignee: E. I. du Pont de Nemours and Company, Wilmington, Del.

[21] Appl. No.: 08/895,642

[22] Filed: Jul. 17, 1997

[51] Int. Cl.⁶ .................................................. C08L 51/00
[52] U.S. Cl. ........................................ 524/504; 524/533
[58] Field of Search ..................... 524/504, 533

[56] References Cited

U.S. PATENT DOCUMENTS

| | | | |
|---|---|---|---|
| 3,960,935 | 6/1976 | Samour | 260/485 |
| 4,098,740 | 7/1978 | Wallace | 260/29.6 |
| 4,255,308 | 3/1981 | Brasen | 524/522 |
| 4,336,177 | 6/1982 | Backhouse et al. | 523/201 |
| 4,355,071 | 10/1982 | Chang | 428/334 |
| 4,390,658 | 6/1983 | Graetz et al. | 524/512 |
| 4,403,003 | 9/1983 | Backhouse | 427/407.1 |
| 4,419,465 | 12/1983 | Backhouse et al. | 523/201 |
| 4,680,352 | 7/1987 | Janowicz et al. | 526/147 |
| 5,010,140 | 4/1991 | Antonelli et al. | 525/269 |
| 5,166,254 | 11/1992 | Nickle | 524/555 |
| 5,169,719 | 12/1992 | Balatan | 428/423.1 |
| 5,179,158 | 1/1993 | Azuma | 524/748 |
| 5,231,131 | 7/1993 | Chu et al. | 524/504 |
| 5,234,989 | 8/1993 | Chen et al. | 524/556 |
| 5,250,605 | 10/1993 | Hazan et al. | 524/504 |
| 5,264,530 | 11/1993 | Darmon et al. | 526/194 |
| 5,266,645 | 11/1993 | Siol | 525/309 |
| 5,314,945 | 5/1994 | Nickle | 524/555 |
| 5,314,958 | 5/1994 | Himori | 525/292 |
| 5,336,725 | 8/1994 | Tone | 525/309 |
| 5,342,882 | 8/1994 | Göebel et al. | 524/832 |
| 5,362,826 | 11/1994 | Berge et al. | 526/194 |
| 5,371,151 | 12/1994 | Berge et al. | 525/377 |
| 5,459,174 | 10/1995 | Merrill et al. | 522/35 |
| 5,468,801 | 11/1995 | Antonelli | 525/72 |
| 5,491,191 | 2/1996 | Chen | 524/576 |
| 5,496,884 | 3/1996 | Weih et al. | 524/503 |
| 5,502,089 | 3/1996 | Bricket et al. | 524/44 |
| 5,502,113 | 3/1996 | Antonelli et al. | 525/287 |
| 5,502,189 | 3/1996 | Slongo et al. | 544/216 |
| 5,532,027 | 7/1996 | Nordstrom et al. | 427/493 |
| 5,739,210 | 4/1998 | Scranton | 525/279 |

FOREIGN PATENT DOCUMENTS

| | | | |
|---|---|---|---|
| 1495745 | 3/1975 | Germany | C08G 18/08 |
| WO 95/32228 | 11/1995 | WIPO | C08F 290/04 |
| WO 95/32229 | 11/1995 | WIPO | C08F 290/04 |
| WO 95/32255 | 11/1995 | WIPO | C09D 155/00 |

*Primary Examiner*—Paul R. Michl
*Attorney, Agent, or Firm*—Hilmar L. Fricke

[57] ABSTRACT

This invention is directed to an aqueous coating composition containing about 40–90% by weight, based on the weight of the coating composition, of an aqueous carrier and 10–60% by weight, based on the weight of the coating composition, of a binder of (a) about 50 to 98%, based on the weight of the binder, of a crosslinked graft copolymer comprising:
  (i) 2 to 98%, based on the weight of the graft copolymer, of a polymeric backbone of polymerized mono ethylenically unsaturated monomers and 0.5-10.0% by weight, based on the weight of the backbone, of polymerized difunctional ethylenically unsaturated crosslinking monomers and
  (ii) 98 to 2%, by weight of the graft copolymer, of macromonomers attached to said polymeric backbone at a single terminal point of each macromonomer, said macromonomers containing polymerized ethylenically unsaturated monomers and about 10 to 90%, based on the weight of the macromonomer, of polymerized ethylenically unsaturated monomers all containing carboxylic functionality such that the macromonomers are water dispersible when neutralized with an amine and the macromonomers have a weight average molecular weight of about 1,000–30,000;

said graft copolymer being in the form of a stabilized crosslinked latex; and (b) 2 to 50%, based on the weight of the binder, of a crosslinking agent which, when the composition is cured, reacts and crosslink with the graft copolymer; such a composition provides an automotive finish with improved properties such as improved chip resistance in comparison to conventional finishes that are formed from a non-crosslinked latex.

9 Claims, No Drawings

AQUEOUS COATING COMPOSITION OF A SELF-STABILIZED CROSSLINKED LATEX

TECHNICAL FIELD

This invention relates to an improved aqueous composition for coating a variety of substrates. In particular, this invention is directed to an aqueous coating composition of a crosslinked self-stabilized latex of a graft copolymer which is particularly useful as the pigmented color coat of a color coat/clear coat finish that is used as an exterior finish on automobiles and trucks.

BACKGROUND OF THE INVENTION

Automobiles and trucks have exterior finishes for several well known reasons. First, such finishes provide barrier protection against corrosion. Second, consumers prefer an exterior finish having an attractive aesthetic finish, including high gloss and excellent DOI (distinctness of image).

The exterior surface of a typical automobile or truck has several layers of finishes or coatings. If the substrate is steel, it typically is first coated with an inorganic rust-proofing zinc or iron phosphate layer over which is provided a primer which can be an electrocoated primer or a repair primer. Optionally, a primer surfacer can be applied to provide for better appearance and/or improved adhesion. A pigmented basecoat or color coat is next applied over the primer. A typical basecoat or color coat contains a mixture of pigments, which may include metallic flake pigments in the case of a metallic finish. In order to protect and preserve the aesthetic qualities of the finish on the vehicle, it is well known to provide a clear (unpigmented) topcoat or clear coat over the colored (pigmented) basecoat, so that the basecoat remains unaffected even on prolonged exposure to the environment or weathering.

Aqueous coating compositions of a self-stabilized latex of a graft copolymer which can be pigmented and used as a basecoat in a clear coat/base coat finish for automobile and trucks is shown in WO Patent application 95/3229 published Nov. 30, 1995. While the coating composition disclosed therein are adequate, improvement is need for chip resistance of the finish formed from such coatings. Chipping of an automotive finish occurs when debris strikes the automobile while driving and this debris is usually in the form of stones, gravel and or sand. The coating composition of this invention provides a finish with improved chip resistance in comparison to those of the prior art.

SUMMARY OF THE INVENTION

The present invention is directed to an aqueous coating composition containing about 40–90% by weight, based on the weight of the coating composition, of an aqueous carrier and 10–60% by weight, based on the weight of the coating composition, of a binder of (a) about 50 to 98%, based on the weight of the binder, of a crosslinked graft copolymer comprising:
 (i) 2 to 98%, based on the weight of the graft copolymer, of a polymeric backbone of polymerized mono ethylenically unsaturated monomers and 0.5–10.0% by weight, based on the weight of the backbone, of polymerized difunctional ethylenically unsaturated crosslinking monomers and
 (ii) 98 to 2%, by weight of the graft copolymer, of macromonomers attached to said polymeric backbone at a single terminal point of each macromonomer, said macromonomers containing polymerized ethylenically unsaturated monomers and about 10 to 90% by weight, based on the weight of the macromonomer, of polymerized ethylenically unsaturated monomers all containing carboxylic functionality such that the macromonomers are water dispersible when neutralized with an amine and the macromonomers have a weight average molecular weight of about 1,000–30,000;
said graft copolymer being in the form of a stabilized crosslinked latex; and
(b) 2 to 50%, based on the weight of the binder, of a crosslinking agent which, when the composition is cured, reacts and crosslink with the graft copolymer.

DETAILED DESCRIPTION OF THE INVENTION

The waterborne coatings of the present invention comprise a binder of a latex of an acrylic polymer and a crosslinking agent in an aqueous carrier. This binder comprises a crosslinked latex of water dispersible acrylic graft copolymer which is formed by free radical initiated copolymerization of alpha-beta unsaturated monomers in the presence of an acrylic macromonomer. The acrylic macromonomer has an weight average molecular weight (MW) of about 1,000 to 30,000 and containing at least 10% of a polymerized acid functional alpha-beta unsaturated monomer. After at least partial neutralization of the carboxyl groups for example, with an amine, these acrylic graft copolymers crosslink and form stable dispersions in water, i.e., a latex. These copolymers form particles in aggregate with each other and other resins in the composition. The macromonomers used to form the graft copolymer are relatively hydrophilic and hence soluble or dispersible in the aqueous carrier, and the polymeric backbone (to which the macromonomers are attached) is relatively water insoluble. The particles are crosslinked by means of di(meth)acrylate monomeric units in the backbone and have an average particle size of 50 to 1000 nanometers (nm), preferably 100 to 250 nm.

Suitable crosslinking agents for the coating composition are melamine formaldehyde or alkylated melamine formaldehyde compounds or a blocked or unblocked isocyanate compound in a one-package system or an isocyanate compound, a water-dispersible polyisocyanate, in a two-package system, or other crosslinking agents such as epoxies, silanes, carbodiimides, etc. able to react with the functional groups present on the graft copolymer.

The coating composition of this invention is especially useful for finishing the exterior of automobiles and trucks and parts thereof. The coating composition, depending on the presence of pigments and other conventional components, may be used as a primer, primer surfacer, basecoat, and/or clearcoat. It is especially advantageous for use as an aqueous pigmented basecoat. The invention also includes a process for coating a substrate with the above coating composition.

The coating composition of the present invention offers several significant advantages over conventional waterbased coating compositions. The graft copolymer used in the coating composition with acid groups concentrated in one segment requires less acid to obtain a stable dispersion, thus leaving fewer moisture sensitive carboxylic groups in the final coating. Standard emulsions are stabilized by surfactants which besides remaining in the film as moisture sensitive residues, migrate to the coating interfaces and generate weak boundary layers which lead to poor adhesion and delamination. The surfactants also stabilize foam formed by trapped air during spraying, leading to pinholing. The compositions of this invention can be made with lesser amounts of surfactants, preferably no surfactants. Standard emulsions for which water is a non-solvent, need considerable solvent to allow coalescence (film formation) after being applied to a surface. This leads to higher VOC (volatile organic content). In the present invention, the hydrophilic macromonomers which are on the surface of the self-stabilized lattices are plasticized by the water and allow film formation with little or no solvent, thus allowing coating compositions to be formulated with much lower VOC. Finishes of the coating composition of this invention have excellent properties and in particular provide improved chip resistance in comparison to finishes formed with conventional water based compositions.

The coating composition of this invention may use together with the above-described graft copolymer a curable linear or branched film-forming polymers or binder materials, in various proportions. For example, the composition may comprise linear or branched hydroxy-functional acrylic, polyester, or polyurethane copolymers. Additional binder materials, in relatively minor amounts, include, for example thickeners, adhesion promoters, etc. may be included.

In general, the total polymeric components of a coating composition are conventionally referred to as the "binder" or "binder solids" and are dissolved, emulsified or otherwise dispersed in the aqueous liquid carrier. The binder solids generally include all the normally solid polymeric components of the composition. Generally, catalysts, pigments, or chemical additives such as stabilizers are not considered part of the binder solids. Non-binder solids other than pigments usually do not amount for more than about 10% by weight of the composition. The coating composition of the present invention suitably contains about 40–90%, more typically 50–70% by weight of the binder, and about 10–60%, more typically 30–50% by weight, of an aqueous carrier.

The present composition contains about 50 to 98% by weight, preferably suitably 40 to 80%, based on the weight of the binder, of the graft copolymer.

The graft copolymer contains about 2–98%, preferably 5–40%, and most preferably 15–40% by weight of macromonomer and correspondingly about 98–2%, preferably 60–95%, most preferably 60–85% by weight of backbone polymer. The side chains of the graft copolymer are formed from relatively water soluble macromonomers that have a weight average molecular weight of about 1,000–30,000 and preferably 3,000–10,000 and contain about 10–90% by weight and preferably 20–50% by weight, based on the weight of the macromonomer, of polymerized ethylenically unsaturated acid monomers which are then at least partially neutralized. These side chains are relatively hydrophilic and keep the graft polymer well dispersed in the resulting coating composition.

The backbone of the graft copolymer is hydrophobic relative to the side chains and contains polymerized ethylenically unsaturated monomers which are preferably (meth) acrylates or styrene. The term (meth)acrylate means esters of both acrylic and methacrylic acid. Such monomers may comprise alkyl (meth)acrylates, cycloaliphatic (meth) acrylates and aryl (meth)acrylates as are listed hereinafter. The backbone may contain up to 50% by weight of polymerized ethylenically unsaturated non-hydrophobic monomers which may contain reaction functional groups other than acid groups. Examples of such monomers are hydroxy alkyl (meth) acrylates, such as hydroxy ethyl acrylate, hydroxy ethyl methacrylate, hydroxy propyl acrylate, hydroxy propyl methacrylate, hydroxy butyl methacrylate and the like, acrylamide, nitro phenol acrylate, nitro phenol methacrylate, phthalimido methyl acrylate, and phthalimido methacrylate.

The backbone of the graft copolymer contains about 0.5–10% by weight of a polymerized difunctional ethylenically unsaturated crosslinking monomers, typically an alkylene glycol di(meth)acrylate such as 1,4 butylene glycol diacrylate, 1,4 butylene glycol dimethacrylate, 1,3 propylene glycol diacrylate, 1,3 propylene glycol dimethacrylate, ethylene glycol diacrylate, ethylene glycol dimethacrylate hexane diol diacrylate and the like. These monomers react and result in crosslinked latex particles.

As indicated earlier, the graft polymer comprises macromonomer side chains attached to a polymeric backbone. Each macromonomer ideally contains a single terminal ethylenically unsaturated group which is polymerized into the backbone of the graft copolymer and typically contains polymerized monomers of methacrylic or acrylic acid, esters thereof, nitriles, amides or mixtures of these monomers.

The acrylic macromonomer is preferably prepared using a free radical initiator in a solvent with a Co (II) or Co (III) chelate chain transfer agent and contains 10 to 90 percent, preferably 20 to 50 percent, by weight of an acid functional monomer, e.g., acrylic acid, methacrylic acid, maleic acid, and itaconic acid or their anhydrides (which can be hydrolyzed to the acid after polymerization).

In addition to the acid, up to 90% by weight, based on the weight of the macromonomer, of other polymerized ethylenically unsaturated monomers can be present in the macromonomer, for example, but not limited to (meth) acrylate esters of straight-chain or branched monoalcohols of 1 to 20 carbon atoms. The majority of these, greater than 50%, preferably 60–80% of the macromonomer, should be methacrylates, for example, alkyl methacrylates having 1–12 carbons in the alkyl group can be used such as methyl methacrylate, ethyl methacrylate, propyl methacrylate, isopropyl methacrylate, butyl methacrylate, pentyl methacrylate, hexyl methacrylate, 2-ethyl methacrylate, nonyl methacrylate, lauryl methacrylate and the like can be used. Cycloaliphatic methacrylates can be used such as trimethylcyclohexyl methacrylate, t-butyl cyclohexyl methacrylate, isobornyl methacrylate, 2-ethylhexyl methacrylate, and the like. Aryl methacrylates such as benzyl methacrylate also can be used.

Up to 40% by weight and preferably 5–30% by weight, based on the weight of the macromonomer, can be polymerized ethylenically unsaturated monomers containing hydroxy functionality include hydroxy alkyl (meth) acrylates, wherein the alkyl group has 1 to 12 carbon atoms. Suitable monomers include hydroxy ethyl acrylate, hydroxy propyl acrylate, hydroxy isopropyl acrylate, hydroxy butyl acrylate, hydroxy ethyl methacrylate, hydroxy propyl methacrylate, hydroxy isopropyl methacrylate, hydroxy butyl methacrylate, and the like, and mixtures thereof. Reactive functionality may also be obtained from monomer precursors, for example, the epoxy group of a glycidyl methacrylate unit in a polymer. Such an epoxy group may be converted, in a post polymerization reaction with water or a small amount of acid, to a hydroxy group, or with ammonia and/or a primary amine to give a hydroxy amine.

Suitable other olefinically unsaturated comonomers include: acrylamide and methacrylamide and derivatives as alkoxy methyl (meth) acrylamide monomers, such as methacrylamide, N-isobutoxymethyl methacrylamide, and N-methylol methacrylamide; male ic, itaconic and maleic anhydride and their half and diesters; vinyl aromatics such as styrene, alkyl styrene and vinyl toluene; polyethylene glycol monoacrylates and monomethacrylates; aminofunctional (meth) acrylates as, e.g., diethylaminoethyl methacrylate and t-butylaminoethyl methacrylate; glycidyl functional (meth) acrylates as glycidylmethacrylate.

The graft copolymer may be prepared by polymerizing ethylenically unsaturated monomers in the presence of macromonomers each having a terminal ethylenic unsaturation for grafting. The resulting graft copolymer can be envisioned as being composed of a backbone having a plurality of macromonomer "arms" attached thereto. In the present composition, both the macromonomer arms and the backbone may have reactive functionalities capable of reacting with a crosslinking agent, although it is optional to have such reactive functionalities only on the macromonomers. It is to be understood that the macromonomers referred to as having carboxylic functionality may be part of a mixture of macromonomers of which a portion do not have any carboxylic functionality or variable amounts of carboxylic functionality. It is also understood that, in preparing any macromonomers, there is a usually a normal distribution of functionality.

To ensure that the resulting macromonomer only has one terminal ethylenically unsaturated group which will polymerize with the backbone monomers to form the graft copolymer, the macromonomer is polymerized by using a catalytic chain transfer agent. Typically, in the first step of the process for preparing the macromonomer, the monomers are blended with an inert organic solvent which is water miscible or water dispersible and a cobalt chain transfer agent and heated usually to the reflux temperature of the reaction mixture. In subsequent steps additional monomers and cobalt catalyst and conventional polymerization catalyst are added and polymerization is continued until a macromonomer is formed of the desired molecular weight.

Preferred cobalt chain transfer agents or catalysts are described in U.S. Pat. No. 4,680,352 to Janowicz et al, U.S. Pat. No. 4,722,984 to Janowicz and WO 87/03605, hereby incorporated by reference in their entirety. Most preferred are pentacyanocobaltate (II or III), diaquabis (borondifluorodimethyl-glyoximato) cobaltate (II or III) and diaquabis(borondifluorophenylglyoximato) cobaltate (II or III), ethylenically unsaturated sulfonic, sulfinic, phosphoric or phosphonic acid and esters thereof also can be used such as styrene sulfonic acid, acrylamido methyl propane sulfonic acid, vinyl phosphonic acid and its esters and the like. Typically these chain transfer agents are used at concentrations of about 5–1000 ppm based on the monomers used.

Other chain transfer agents that provide vinyl terminated macromonomers, including, for example, allyl sulfides, malonates, and the like.

The macromonomer is preferably formed in a solvent or solvent blend using a free radical initiator and a Co (II or III) chelate chain transfer agent, although it can be formed in aqueous solution or emulsion when using, for example, diaquabis(borondifluorodimethyl-glyoximato) cobaltate (II or III).

Az-initiators (0.5–5% weight on monomer) can be used in the synthesis of the macromonomers in the presence of 2–5,000 ppm (on total monomer) of Co (II or III) chelate in the temperature range of 30–180° C. Preferred azo type initiators are, e.g., 2,2'-azobis (2,4 dimethylpentanenitrile), 2,2'-azobis (2-methylpropanenitrile), 2,2'-azobis (2-methylbutanenitrile), 1,1'-azo (cyclohexane carbonitrile) and 4,4'-azobis (4-cyanopentanoic) acid.

Typical solvents that can be used to form the macromonomer copolymer are aromatics, aliphatics, ketones such as methyl ethyl ketone, isobutyl ketone, ethyl amyl ketone, acetone, alcohols such as methanol, ethanol, n-butanol, isopropanol, esters such as ethyl acetate, glycols such as ethylene glycol, propylene glycol, ethers such as tetrahydrofuran, ethylene glycol mono butyl ether and the like, and as mentioned above, water and mixtures thereof with water miscible solvents.

After the macromonomer is formed as described above, solvent is optionally stripped off, the macromonomer is neutralized, and the backbone monomers added to the macromonomer along with polymerization catalyst. Neutralizing agents for acids of the macromonomer that are used are amines such as amino methyl propanol, amino ethyl propanol, dimethyl ethanol amine, triethylamine dimethylethanol amine and the like or inorganic bases such as ammonium hydroxide.

As indicated above, the graft copolymer is formed directly into water, wherein the macromonomer is first neutralized and dispersed or dissolved in water. The graft copolymer is formed by copolymerizing the rest of the monomer blend in the presence of the macromonomer water solution or dispersion. This procedure has the advantage that less cosolvent is used in the overall process and solvent stripping can be eliminated. Another advantage is that higher molecular weight graft polymers can be obtained than in solvent polymerization.

Mixtures of suitably compatible macromonomers can be used as long as all are anionic in water.

Any of the aforementioned azo type catalysts can be used as can other suitable catalysts such as peroxides and hydroperoxides. Typical of such catalysts are di-tertiarybutyl peroxide, di-cumylperoxide, tertiaryamyl peroxide, cumenehydroperoxide, di(n-propyl) peroxydicarbonate, peresters such as amyl peroxyacetate and the like. Polymerization is continued at a specified temperature until a graft copolymer is formed of the desired molecular weight.

Water-soluble free radical initiators can be used, suitably in the temperature range of 20–98° C., e.g., peroxides such as ammonium persulfate, or redoxinitiators such as t-butylhydroperoxide/ascorbic acid. On copolymerizing the monomers with the macromonomer optionally chain transfer agents other than the cobalt chelates can be used as, e.g., mercaptans: mercaptoethanol, t-dodecylmercaptan, N-dodecylmercaptan.

The overall graft copolymer water borne latex should be characterized by an acid value of from 10 to about 150 (mg KOH/g resin solids), more preferably from 15 to about 70 and still more preferably from 15 to about 35, and an hydroxyl number of about 0 to about 250 (mg KOH/g resin solids), more preferably from 40 to 150.

The degree of neutralization of the latex can be from 10 to 150% of the total amount of acid groups, preferably from 80–105%. The final pH of the latex can accordingly be about 4–10, preferably 7–10.

The above described binders are utilized to produce waterborne coatings by blending with other suitable components in accordance with normal paint formulation techniques.

The latex of the graft copolymers of the present invention are useful as film forming binders in waterborne coating compositions such as, for example, clearcoat or basecoat compositions useful in automotive applications. The resultant coating compositions have low volatile organic content, preferably to a maximum of 3.50 pounds/gallon. In preparing the coating compositions of the present invention, the graft copolymer is combined with a crosslinking agent in the amount of 2 to 50% by weight of binder, preferably 10 to 40% by weight of binder.

To form a composition which will crosslink under elevated baking temperatures of about 60–180° C. for about 5–60 minutes, about 2 to 50%, preferably 10 to 40% by weight, based on the weight of the binder, of a water-soluble water dispersible alkylated melamine formaldehyde crosslinking agent having 1–4 carbon atoms on the alkylated group is preferred.

These crosslinking agents are generally partially or fully alkylated melamine formaldehyde compounds and may be monomeric or polymeric and if polymeric have a degree of polymerization of about 1–3. Typical alcohols used to alkylate these resins are methanol, ethanol, propanol, butanol, isobutanol, and the like.

Particularly preferred is hexamethoxy methylol melamine. Preferred alkylated melamine crosslinking agents that are commercially available include Cymel~301, 373, 385, 1161, 350, or 1168 (Monsanto) or Resimine~714, Resimine~730 and 731, Resimine~735 and 745 (Cyanamid).

Coating compositions of this invention containing a melamine crosslinking agent can contain about 0.1 to 3.0%, based on the weight of a binder, of a strong acid catalyst or a salt thereof to lower curing temperatures and time. Para-toluene sulfonic acid is a preferred catalyst or its ammonium salt. Other catalysts that can be used are dodecyl benzene sulfonic acid, phosphoric acid and amine or ammonium salts of these acids.

The graft copolymer dispersion can be used in a binder formulation that is cured with a polyisocyanate; a water dispersible polyisocyanate is added to the waterborne graft copolymer dispersion prior to application. Examples of water dispersible polyisocyanates include biuret and cyclotrimers of hexamethylene diisocyanate, isophorone diisocyanate and tetramethyl xylylene diisocyanate. These isocyanates may be modified to such an extent that they contain ionic groups to ease dispersion into water.

Typically, a cure promoting catalyst is utilized in conjunction with the isocyanate crosslinking agent. Preferred catalysts are organometallics, suitably dibutyl tin dilaurate, dibutyl tin di-2-ethylhexoate, zinc octoate, zinc napthenate, vanadium acetyl acetonate, or zirconium acetyl acetonate, in an effective curing amount, typically from about 0.1 to 2% by weight of binder. Such catalysts are optional, for example, elevated temperature and/or time may suffice to cure the composition.

Typical isocyanate crosslinking agents which may be used for curing the composition include both compounds and polymers, blocked or unblocked. Examples of suitable polyisocyanates include monomeric polyisocyanates such as toluene diisocyanate and 4,4'-methylene-bis (cyclohexylisocyanate), isophorone diisocyanate and NCO-prepolymers such as the reaction products of monomeric polyisocyanate such as those mentioned above with polyester or polyether polyols. Particularly useful isocyanates are isophorone diisocyanate and the biuret-form 1,6-hexamethylene diisocyanate commercially available from Bayer as "Desmodur" N or the like. Other crosslinking agents include 4,4'-biphenylene diisocyanate, tetramethyl diisocyanate, ethylethylene diisocyanate, 1,3-cyclopentylene diisocyanate, 1,3-phenylene diisocyanate, 1,5-naphthalene diisocyanate, bis(4-isocyanatocyclohexyl) methane, and the like.

Trifunctional isocyanates may be used, for example, triphenylmethane triisocyanate, 1,3,5-benzene triisocyanate, 2,4,6-toluene triisocyanate, an adduct of trimethylol and tetramethyl xylene diisocyanate sold under the tradename "Cythane 3160," "Desmodur" N 3390 which is the trimer of hexamethylene diisocyanate, and the like. Optionally, one can use a polyisocyanate acrylic copolymer derived from isocyanatoethyl methacrylate (commercially available as TMI) and the like.

As indicated above, the polyisocyanate may optionally be blocked. Examples of suitable blocking agents are those materials which would unblock at elevated temperatures, for example, lower aliphatic alcohols such as methanol, oximes such as methylethyl ketone oxime, and lactams such as epsiloncaprolactam. Blocked isocyanates can be used to form stable one-package systems. Polyfunctional isocyanates with free isocyanate groups can be used to form two-package room temperature curable systems. In these systems, the product and isocyanate curing agent are mixed just prior to their application.

Other film-forming polymers, preferably 0 to 55 percent by weight (and concomitantly 45 to 100% by weight of the graft copolymer), based on the weight of the binder, may also be used in conjunction with the graft copolymer. Other film forming polymers may be linear or branched and may include acrylics, acrylourethanes, polyesters, polyester urethanes, polyethers, and polyether urethanes that are compatible with the graft polymer.

An organic cosolvent is also typically utilized in the present composition, preferably in minimal amounts, less than 20% by weight of carrier, to facilitate formulation and application of the coating compositions of the present invention. An organic solvent is utilized which is compatible with the components of the composition.

The amounts of graft copolymer, curing agent, and catalyst will vary widely depending upon many factors, among them the specific components of the composition and the intended use of the composition.

In addition, a composition according to the present invention may contain a variety of other optional ingredients, including pigments, pearlescent flakes, fillers, plasticizers, antioxidants, surfactants and flow control agents.

To improve weatherability of a finish produced by the present coating composition, an ultraviolet light stabilizer or a combination of ultraviolet light stabilizers can be added in the amount of about 0.1–5% by weight, based on the weight of the binder. Such stabilizers include ultraviolet light absorbers, screeners, quenchers, and specific hindered amine light stabilizers. Also, an anitoxidant can be added, in the about 0.1–5% by weight, based on the weight of the binder.

Typical ultraviolet light stabilizers that are useful include benzophenones, triazoles, triazines, benzoates, hindered amines and mixtures thereof.

Specific examples of ultraviolet stabilizers are disclosed in U.S. Pat. No. 4,591,533.

The composition may also include conventional formulation additives such as flow control agents, for example, Resiflow\S (polybutylacrylate), BYK 320 and 325 (high molecular weight polyacrylates); rheology control agents, such as fumed silica, microgels, and non-aqueous dispersion polymers; water scavengers such as tetrasilicate, trimethyl orthoformate, triethyl orthoformate, and the like.

When the composition is used as a clearcoat (topcoat) over a pigmented colorcoat (basecoat) to provide a colorcoat/clearcoat finish, small amounts of pigment can be added to the clear coat to provide special color or aesthetic effects such as tinting.

The composition preferably is pigmented and used as a colorcoat, monocoat, primer, or primer surfacer. The composition has excellent adhesion to a variety of metallic or non-metallic substrates, such as previously painted substrates, cold rolled steel, phosphatized steel, and steel coated with conventional primers by electrodeposition. The composition can be used to coat plastic substrates such as polyester reinforced fiberglass, reaction injection-molded urethanes and partially crystalline polyamides.

When the coating composition is used as a basecoat, pigments are added in a pigment to binder weight ratio of about 1/100–150/100. Typical pigments that can be added to the composition include the following: metallic oxides such as titanium dioxide, zinc oxide, iron oxides of various colors, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbazole violet, isoindolinones, isoindolones, thioindigo reds, benzimidazolinones, metallic flake pigments such as aluminum flake and the like.

The pigments can be introduced into the coating composition by first forming a mill base or pigment dispersion with any of the aforementioned polymers used in the coating composition or with another compatible polymer or dispersant by conventional techniques, such as high speed mixing, sand grinding, ball milling, attritor grinding or two roll milling. The mill base is then blended with the other constituents used in the coating composition to obtain the present coating compositions.

The coating composition can be applied by conventional techniques such as spraying, electrostatic spraying, dipping, brushing, flowcoating and the like. The preferred techniques are spraying and electrostatic spraying. The composition may be used as an ambient cure, especially for refinish, or at elevated temperature. In OEM applications, the composition is typically baked at 100–150° C. for about 15–30 minutes to form a coating about 0.1–3.0 mils thick. When the composition is used as a clearcoat, it is applied over the colorcoat which may be dried to a tack-free state and cured or preferably flash dried for a short period before the clearcoat is applied. The colorcoat/clearcoat finish is then baked as mentioned above to provide a dried and cured finish.

It is customary to apply a clear topcoat over a basecoat by means of a "wet-on-wet" application, i.e., the topcoat is applied to the basecoat without curing or completely drying the basecoat. The coated substrate is then heated for a predetermined time period to allow simultaneous curing of the base and clear coats.

The following examples illustrate the invention. All parts and percentages are on a weight basis unless otherwise indicated. All molecular weights disclosed herein are determined by gel permeation chromatography using a polystyrene standard.

EXAMPLES

A self stabilized crosslinked latex was prepared by forming a macromonomer and then polymerizing the macromonomers with backbone monomers to form a graft copolymer latex.

A solution of the macromonomer was prepared by charging the following constituents into a polymerization vessel equipped with a stirrer, a heat source, a thermometer, a reflux condenser and a nitrogen inlet and polymerizing under a nitrogen atmosphere:

|  | Parts by Weight |
|---|---|
| Portion 1 | |
| Methacrylic acid monomer (MAA) | 61.600 |
| 2-Hydroxy ethyl methacrylate monomer (HEMA) | 47.000 |
| Methyl methacrylate monomer (MMA) | 4.610 |
| Butyl methacrylate monomer (BMA) | 89.300 |
| Isopropyl alcohol | 259.800 |
| Portion 2 | |
| Methyl ethyl ketone | 9.000 |
| Isopropyl alcohol | 17.800 |
| DMG COBALT 3 Catalyst [diaquabis(borondifluorodimethylglyoximoto) cobaltate (III)] | 0.014 |
| VAZO 52 polymerization initiator [2,2-azobis-(2,4-dimethylvaleronitrile)] | 0.202 |
| Portion 3 | |
| Isopropyl alcohol | 15.600 |
| Portion 4 | |
| Methyl ethyl ketone | 24.060 |
| Isopropyl alcohol | 56.140 |
| DMG COBALT 3 Catalyst (described above) | 0.0280 |
| VAZO 52 polymerization initiator (described above) | 2.200 |
| Portion 5 | |
| Methacrylic acid monomer | 92.400 |
| 2-Hydroxy ethyl methacrylate monomer | 30.000 |
| Methyl methacrylate monomer | 3.082 |
| Butyl methacrylate monomer | 57.000 |
| Total | 769.836 |

Portion 1 was added to the polymerization vessel with mixing and heated to reflux temperature and held at this temperature. Portion 2 was premixed just before adding and then added at one time and held for 5 minutes and Portion 3 was added. Portions 4 and 5 were premixed and each were added simultaneously to the reaction vessel. 54.6% of Potion 4 was over 90 minutes and the remainder was added over 240 minutes. 67% of Portion 5 was added a over 120 minutes and the remainder added over 120 minutes. The resulting reaction mixture was then held at reflux for 45 minutes. The resulting macromonomer solution was allowed to cool to room temperature. The macromonomer contains BMA/HEMA/MAA in a weight ratio of 40/20/40.

A self stabilized crosslinked latex was prepared by charging the following constituents into a polymerization vessel equipped as above:

|  | Parts by Weight |
|---|---|
| Portion 1 | |
| Deionized water | 430.00 |
| 1-Amino 1-methyl propanol | 14.91 |
| Macromonomer solution (prepared above) | 67.27 |
| Portion 2 | |
| T-butyl hydroperoxide | 6.00 |

-continued

| | Parts by Weight |
|---|---|
| Portion 3 | |
| Butyl acrylate monomer (BA) | 76.17 |
| Methyl acrylate monomer (MA) | 30.47 |
| Methyl methacrylate monomer (MMA) | 36.57 |
| Styrene monomer (STY) | 91.42 |
| 2-Hydroxy ethyl acrylate monomer (HEA) | 60.95 |
| 1,4 Butylene glycol diacrylate | 9.13 |
| Portion 4 | |
| Deionized water | 51.30 |
| Sodium bisulfite | 4.70 |
| Total | 878.89 |

Portion 1 was charged into the polymerization vessel and held at 30° C. for 40 minutes while purging the vessel with nitrogen. Portion 2 was added at one time and the reaction mixture was held at the above temperature for 5 minutes. 40% of Portions 3 and 4 were then added at the same time. If there is an exothermic reaction, the mixture is held for 20 minutes and if no exothermic reaction occurs the mixture is held for one hour. The remainder of Portions 3 and 4 was added over a 4 hour period while maintaining the reaction temperature at or below 50° C. When all of Portions 3 and 4 had been added, the resulting reaction mixture was held for 1 hour at 40° C. and then cooled to room temperature and filter through a 150 micron filter. The resulting latex had a solids content of about 39.5% and the backbone of the graft copolymer contains BA/MA/HEA/STY/MMA/1,4 Butylene glycol diacrylate(wt. ratio 25/10/20/30/12/3) and side chains contain BMA/HEMA/MAA (wt. ratio of 40/20/40).

Coating composition I was prepared by blending together the following constituents:

| | Parts by Weight |
|---|---|
| Aqueous white pigment slurry (68% titanium dioxide pigment solids) | 27.540 |
| Deionized water | 15.294 |
| Catalyst solution (0.24 parts dodecyl benzene sulfonic acid, 0.102 parts diisopropanol amine, 0.514 parts methanol and 0.102 parts isopropanol) | 0.960 |
| "Cymel" 301 (hexamethoxy methylol melamine) | 4.590 |
| UV screener (0.225 parts "Tinuvin" 384 and 0.011 parts xylene) | 0.237 |
| Self stabilized crosslinked latex (prepared above) | 44.450 |
| 1-Amino 1-methyl propanol solution(containing 4% water) | 0.286 |
| Mineral spirits | 2.889 |
| 2,2,4-trimethyl-1,3-pentane diol monoisobutyrate | 0.455 |
| Ethylene glycol butyl ether | 1.919 |
| Water dispersible polyester resin | 1.380 |
| Total | 100.000 |

The above constituents were blended together in the order shown to form Coating Composition I.

Coating Composition I was used as the basecoat for basecoat/clear coat panels and tested for chip resistance. Phosphated cold rolled steel panels electrocoated with 0.9–1.2 mil thick coating of a cathodic epoxy based resins crosslinked with isocyanate which was primed with a layer of a gray polyester melamine primer surfacer were sprayed with 2 coats of above prepared Coating Composition I which were flash dried for about 3 minutes at room temperature between coats and then baked for 10 minutes at about 82° C. to give a coating about 0.8–1.0 mils thick and then 2 coats of a clear coating composition of an acrylosilane containing a melamine crosslinking agent (described in Example 1 of U.S. Pat. No. 5,532,027) were applied by spraying and baked for 30 minutes at about 130° C. to give a clear coat layer about 1.6–1.8 mils thick. The resulting panels had good adhesion and humidity resistance.

A set of the above prepared panels was subjected to a chip test (SAE J 400) in which 2 pints of stones are thrown in a tester against the panels at room temperature.

The panels are rated form 0–10 where 10 is the best rating and 0 is the worst rating. A rating below 6 is considered commercially unacceptable. The above prepared panels had a rating of 7.5 which is considered acceptable for a commercial finish for automobiles and trucks.

A non-crosslinked self stabilized latex was prepared using the same constituents as the above prepared crosslinked self stabilized latex except the 1,4 butylene glycol diacrylate monomer which provided the crosslinking was omitted and replace with butyl acrylate monomer. Coating Composition II was prepared using the same ingredients as above prepared Coating Composition I except the non-crosslinked self stabilized latex was used in place of the crosslinked latex and Coating Composition II was applied and baked and tested as above. The results of the test are as follows: adhesion and humidity resistance were acceptable but the chip test rating was 5.5 which is considered to be unacceptable for a commercial automobile and truck finish.

The results of these tests show that to have a commercially acceptable basecoat composition the crosslinked latex of this invention must be used.

What is claimed is:

1. An aqueous coating composition comprising about 40–90% by weight, based on the weight of the coating composition, of an aqueous carrier and 10–60% by weight, based on the weight of the coating composition, of a binder comprising
   (a) about 50 to 98%, based on the weight of the binder, of a crosslinked graft copolymer consisting of:
      (i) 2 to 98%, based on the weight of the graft copolymer, of a polymeric backbone of polymerized mono ethylenically unsaturated monomers and containing about 0.5–10.0% by weight, based on the weight of the backbone, of polymerized difunctional ethylenically unsaturated crosslinking monomers consisting of alkylene glycol di(meth)acrylate and correspondingly
      (ii) 98 to 2%, by weight of the graft copolymer, of macromonomers attached to said polymeric backbone at a single terminal point of each macromonomer, said macromonomers consisting of polymerized ethylenically unsaturated monomers and containing about 10 to 90%, based on the weight of the macromonomer, of polymerized ethylenically unsaturated monomers containing carboxylic acid functionality such that the macromonomers are water dispersible when neutralized with an amine and said macromonomers being formed with a cobalt chelate transfer agent having a weight average molecular weight of about 1,000–30,000;
   wherein said backbone consists of polymerized ethylenically unsaturated monomers selected from the group consisting of alkyl (meth)acrylates, cycloaliphatic (meth)acrylates, aryl (meth)acrylates, styrene, alkyl styrene, and hydroxy alkyl (meth)acrylates and any mixtures thereof; and wherein said alkyl, cycloaliphatic, and aryl groups have 1 to 12 carbon atoms; and said macromonomers consist of polymerized ethylenically unsaturated monomers of hydroxy alkyl (meth)acrylate having 1–4 carbon atoms in the alkyl group and polymerized ethylenically unsaturated monomers containing carboxylic acid functionality selected from the group consisting of acrylic acid and methacrylic acid; and polymerized monomers selected from the group consisting of alkyl (meth)acrylate having 1–12 carbon atoms in the alkyl group and styrene; and wherein the backbone of said graft copolymer is relatively hydrophobic to the macromonomers and the macromonomers are hydrophilic and said graft copolymer being in the form of a stabilized crosslinked latex; and (b) about 2 to 50%, based on the weight of the binder, of a crosslinking agent consisting of an alkylated melamine which, when the composition is cured, reacts and crosslinks with said graft copolymer.

2. The coating composition of claim 1 containing pigment in a pigment to binder weight ratio of about 1/100 to 150/100.

3. The coating composition of claim 1 wherein the macromonomer comprises polymerized alkyl (meth)acrylate monomer, hydroxy alkyl(meth) acrylate and ethylenically unsaturated carboxylic acid monomers.

4. The coating composition of claim 3, wherein said macromonomers comprise between 20 and 50% by weight, based on the weight of said macromonomers, of polymerized ethylenically unsaturated monomers containing carboxylic-acid functionality.

5. The composition of claim 4, wherein said macromonomers further comprise between 5 and 30% by weight, based on the weight of said macromonomer, of polymerized monomers of hydroxy alkyl(meth) acrylate.

6. The coating composition of claim 1 in which the graft copolymer consists essentially of a backbone consisting of butyl acrylate, methyl acrylate, hydroxy ethyl acrylate, styrene, methyl methacrylate and butylene glycol diacrylate and the macromonomers consist of butyl methacrylate, hydroxy ethyl methacrylate, methacrylic acid and the crosslinking agent is hexamethoxy methylol melamine.

7. A substrate coated with a layer of the coating composition of claim 1.

8. A substrate coated with a layer of the composition of claim 2 and having a clear coating in superimposed adherence thereto.

9. A process for preparing the coating composition comprising graft copolymer which has a polymeric backbone having a plurality of macromonomer arms attached thereto, the macromonomer arms having carboxylic-acid capable of stabilizing the graft polymer in aqueous solution, the process comprising (a) preparing macromonomers in a solvent by polymerizing, using a catalytic chain transfer agent, a mixture of ethylenically unsaturated monomers consisting of (1) hydroxy alkyl (meth)acrylate having 1–4 carbon atoms in the alkyl group, (2) 10 to 90% by weight, based on the weight of said macromonomers, of ethylenically unsaturated monomers containing a carboxylic acid functionality selected from the group consisting of acrylic acid and methacrylic acid; and (3) ethylenically unsaturated monomers selected from the group consisting of alkyl (meth)acrylate having 1–12 carbon atoms in the alkyl group and styrene; and (b) neutralizing the macromonomers before dispersing in an aqueous carrier and copolymerizing 2–98% by weight of said macromonomers with a blend of 98–2% by weight of ethylenically unsaturated monomers selected from the group consisting of alkyl (meth) acrylates, cycloaliphatic (meth)acrylates, aryl (meth) acrylates, styrene, alkyl styrene, and hydroxy alkyl (meth)acrylates and any mixtures thereof; and wherein said alkyl, cycloaliphatic, and aryl groups have 1 to 12 carbon atoms; and 0.5–10% by weight of difunctional ethylenically unsaturated crosslinking monomers consisting of alkylene glycol di(meth)acrylate such that said macromoners are incorporated into a backbone at a single terminal point of said macromonomers, such attachment to said backbone occurring by the reaction of a terminal ethylene unsaturation on each of said macromoners with the monomers which polymerize to form said backbone and the difunctional monomers crosslink to form crosslinked polymer particles, thereby forming a graft copolymer latex and blending an alkylated melamine crosslinking agent with the graft copolymer latex to form a coating composition.

* * * * *